US011763507B2

(12) United States Patent
Grochola

(10) Patent No.: US 11,763,507 B2
(45) Date of Patent: Sep. 19, 2023

(54) EMULATING HAND-DRAWN LINES IN CG ANIMATION

(71) Applicants: Sony Group Corporation, Tokyo (JP); Sony Pictures Entertainment Inc., Culver City, CA (US)

(72) Inventor: Pawel Grochola, Culver City, CA (US)

(73) Assignees: Sony Group Corporation, Tokyo (JP); Sony Pictures Entertainment Inc., Culver City, CA (US)

(*) Notice: Subject to any disclaimer, the term of this patent is extended or adjusted under 35 U.S.C. 154(b) by 0 days.

(21) Appl. No.: 16/655,023

(22) Filed: Oct. 16, 2019

(65) Prior Publication Data
US 2020/0184699 A1 Jun. 11, 2020

Related U.S. Application Data

(60) Provisional application No. 62/775,843, filed on Dec. 5, 2018.

(51) Int. Cl.
G06T 13/40 (2011.01)
G06T 11/20 (2006.01)
(Continued)

(52) U.S. Cl.
CPC .......... G06T 13/40 (2013.01); G06F 3/03545 (2013.01); G06F 3/04883 (2013.01);
(Continued)

(58) Field of Classification Search
CPC ....... G06T 11/20; G06T 11/203; G06T 13/00; G06T 13/20; G06T 13/40; G06N 20/00; G06N 20/20; G06F 3/04883
See application file for complete search history.

(56) References Cited

U.S. PATENT DOCUMENTS 5,598,182 A * 1/1997 Berend ................. G06T 11/001
345/441
6,661,418 B1 * 12/2003 McMillan ............. G06T 13/205
345/473
(Continued)

FOREIGN PATENT DOCUMENTS

EP 2568442 A2 3/2013
JP 2018180781 A 11/2018

OTHER PUBLICATIONS

Lampel, "The Beginners Guide to Blender", Aug. 2015, http://www.blenderhd.com/ (Year: 2015).*

(Continued)

Primary Examiner — Kent W Chang
Assistant Examiner — Jonathan M Cofino
(74) Attorney, Agent, or Firm — Procopio, Cory, Hargreaves & Savitch LLP

(57) ABSTRACT

Methods, systems, and apparatus including: first attaching ink lines drawn directly onto characters of the CG animation; first enabling the artist to modify the ink lines using nudges to generate a drawing; first moving the drawing into a UV space and generating first pass training data; second attaching the ink lines onto the characters of the CG animation; second enabling the artist to modify the ink lines; second moving the drawing into the UV space and generating second pass training data; combining the first pass training data and the second pass training data to generate combined data; and creating and outputting a second generation machine learning using the combined data.

14 Claims, 6 Drawing Sheets

(51) Int. Cl.
    *G06F 3/04883*    (2022.01)
    *G06N 20/20*    (2019.01)
    *G06F 3/0354*    (2013.01)
    *G06T 15/20*    (2011.01)

(52) U.S. Cl.
    CPC .............. *G06N 20/20* (2019.01); *G06T 11/20* (2013.01); *G06T 15/205* (2013.01)

(56) References Cited

U.S. PATENT DOCUMENTS

| | | | |
|---|---|---|---|
| 9,041,717 B2 | 5/2015 | Kaschalk et al. | |
| 2010/0045680 A1* | 2/2010 | Havaldar | G06T 13/40 345/473 |
| 2010/0053172 A1* | 3/2010 | DeRose | G06T 13/00 345/473 |
| 2011/0018880 A1* | 1/2011 | Whited | G06T 11/203 345/473 |
| 2011/0249007 A1 | 10/2011 | Kuster | |
| 2016/0027200 A1* | 1/2016 | Corazza | G06T 15/04 345/420 |
| 2016/0358365 A1* | 12/2016 | Sumner | G06T 19/20 |
| 2018/0293713 A1* | 10/2018 | Vogels | G06K 9/627 |

OTHER PUBLICATIONS

Hudon et al., "Deep Normal Estimation for Automatic Shading of Hand-Drawn Characters," V-SENSE, Trinity College Dublin, Ireland, https://www.scss.tcd.ie/~hudonm/pdf/DeepNormals_eccv_GMDL.pdf, created Sep. 18, 2018 in 17 pages.

Jonathan Lampel, The Beginner Guide to Blender, Blenderhd.com 2015 [retrieved on Feb. 12, 2020]. Retrieved from https://www.blenderhd.com/wp-content/uploads/2015/08/BeginnersGuideToBlender.pdf, pp. 27, 45-49.

International Search Report and Written Opinion, issued in PCT/US2019/064696, dated Feb. 20, 2020, 9 pages.

Kosuke Maeda, Suguru Saito, "Non-uniform line-drawings from 3DCG with CNNs", The Special Interest Group Technical Reports of Information Processing Society of Japan, Computer Graphics & Visual Information Science (CG), 2018-CG-169 [on-line], Japan, Information Processing Society of Japan, Feb. 24, 2018, 1-7.

\* cited by examiner

EMULATING HAND-DRAWN LINES IN CG ANIMATION

CROSS-REFERENCE TO RELATED APPLICATIONS

This application claims the benefits of priority under 35 U.S.C. § 119(e) of U.S. Provisional Patent Application No. 62/775,843, filed Dec. 5, 2018, entitled "Ink Lines and Machine Learning for Emulating Hand Drawn Lines". The disclosure of the above-referenced application is incorporated herein by reference.

BACKGROUND

Field

The present disclosure relates to CG animation, and more specifically, to emulating artistic hand-drawn lines in CG animation.

Background

In computer graphics (CG) animation, a goal may include creating rendered characters which provide the feel and look of hand-drawn characters. It was determined that approaches involving "line work/ink lines" based on procedural "rules" (e.g., using Toon Shaders) were ineffective in achieving the satisfactory results. The main problem was that the artists do not draw based on the limited rule sets. A much more robust solution to the problem of creating artistic-looking hand-drawn line work was needed. Further, the created line work needed to be adjusted (if necessary) and incorporated into the existing CG animation.

SUMMARY

The present disclosure provides for emulating artistic hand-drawn lines in CG animation.

In one implementation, a method for emulating artistic hand-drawn lines in CG animation is disclosed. The method includes: first attaching ink lines drawn directly onto characters of the CG animation; first enabling the artist to modify the ink lines using nudges to generate a drawing; first moving the drawing into a UV space and generating first pass training data; second attaching the ink lines onto the characters of the CG animation; second enabling the artist to modify the ink lines; second moving the drawing into the UV space and generating second pass training data; combining the first pass training data and the second pass training data to generate combined data; and creating and outputting a second generation machine learning using the combined data.

In one implementation, wherein the characters are in frames of the CG animation. In one implementation, the ink lines drawn directly onto the characters provide correct ink lines for specific poses of the characters. In one implementation, the nudges are created using a nudging brush. In one implementation, the method further includes keying and interpolating the nudges by directly projecting the ink lines onto the characters. In one implementation, the method further includes generating key frames and interpolating between the key frames. In one implementation, the characters are formed in a 3-D geometry. In one implementation, the first moving the drawing into the UV space allows the artist to work on the 3-D geometry of the characters in a 2-D screen space. In one implementation, the method further includes translating the work done in the 2-D screen space back to the 3-D geometry.

In another implementation, a system for emulating, in CG animation, lines hand drawn by an artist and generating a drawing is disclosed. The system includes: a prediction module configured to receive shot data including camera angle and expression and a second generation machine learning model, the prediction module configured to generate a prediction of the drawing; an adhering module configured to receive the prediction and attach ink lines onto a 3-D geometry of an animated character; and a nudging module configured to enable the artist to modify the ink lines using a nudging brush to generate nudges and move the drawing to a UV space.

In one implementation, training data for the prediction module uses animated curves created for a set of angles with a set of corresponding expression changes.

In another implementation, an apparatus for emulating artistic hand-drawn lines in CG animation to generate a drawing is disclosed. The apparatus includes: means for first enabling to enable an artist to draw ink lines directly onto an animated character in the drawing; means for attaching to attach the drawn ink lines directly onto the animated character; means for second enabling to enable the artist to modify the ink lines using nudges; means for moving to move the drawing to a UV space to enable the artist to work in a 2-D screen space, wherein the means for moving generates first pass training data if a pass is a first pass, while the means for moving generates second training data if the pass is not the first pass; first means for creating to create a first generation machine learning model and send it to the means for attaching for a second pass; means for combining to combine the first pass training data and the second pass training data to generate combined data; and second means for creating to create a second generation machine learning model using the combined data.

In one implementation, the means for first enabling includes a tablet or pad type of device and an electronic pen. In one implementation, the tablet or pad type of device includes at least one application which is able to display the CG animation on a frame-by-frame basis. In one implementation, the means for attaching includes at least one application which is able to process an input made into the means for attaching by the artist to integrate the input onto the CG animation. In one implementation, the means for second enabling enables the artist to use a nudging brush to make the nudges. In one implementation, the means for moving uses the nudges to create key frames and interpolate between the key frames. In one implementation, the means for moving interpolates between the key frames by automatically blending all frames between the key frames.

Other features and advantages should be apparent from the present description which illustrates, by way of example, aspects of the disclosure.

BRIEF DESCRIPTION OF THE DRAWINGS

The details of the present disclosure, both as to its structure and operation, may be gleaned in part by study of the appended drawings, in which like reference numerals refer to like parts, and in which.

DETAILED DESCRIPTION

Figure 1:
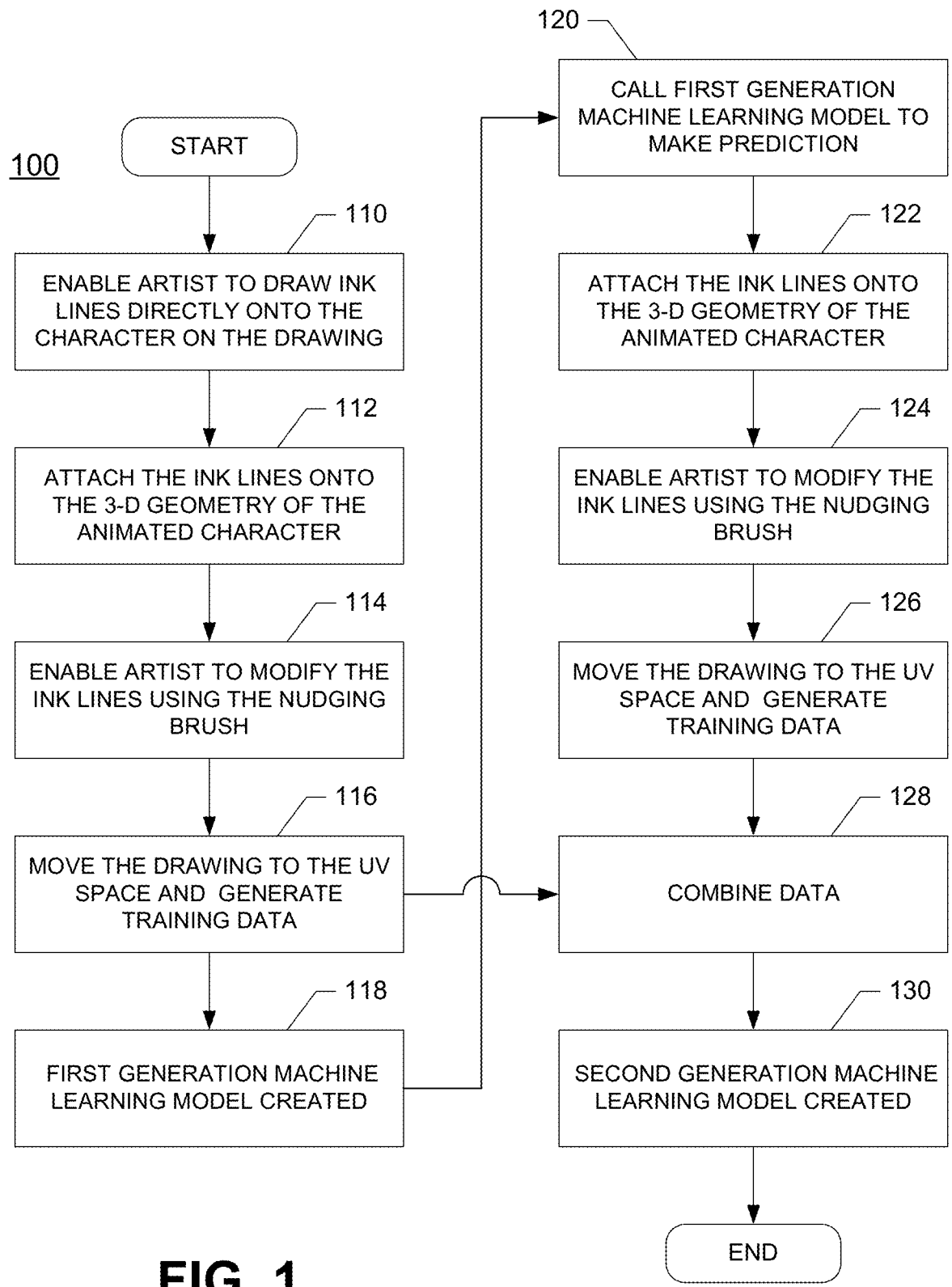
FIG. 1 is a flow diagram of a process for emulating artistic hand-drawn lines in CG animation in accordance with one implementation of the present disclosure.

As noted above, a much more robust solution to the problem of creating artistic-looking hand-drawn line work was needed in CG animation. Further, the created line work needed to be adhered, adjusted (if necessary), and incorporated into the existing CG animation. Certain implementations of the present disclosure provide for emulating artistic hand-drawn lines in CG animation. After reading these descriptions, it will become apparent how to implement the disclosure in various implementations and applications. Although various implementations of the present disclosure will be described herein, it is understood that these implementations are presented by way of example only, and not limitation. As such, this detailed description of various implementations should not be construed to limit the scope or breadth of the present disclosure.

In one implementation, an enhanced ink line application with two modes was implemented to generate a realistic hand-drawn set of ink lines. The first mode was the "adhering mode" and the second mode was the "adjusting mode". The adhering mode of the enhanced ink line application is directed to adhering or attaching the ink lines (e.g., the curve geometry) onto the 3-D geometry of the CG animation. Thus, in the adhering mode, the application provides an artist with easy controls to adjust the drawings to maintain the correct 2-D inspired design. For example, in one implementation, the application enables the artist to use an electronic pen to draw on top of a frame of the CG animation. This allows the drawing of the frame to appear like a dynamic drawing instead of a standard texture map. The adjusting mode of the enhanced ink line application is directed to capturing and cataloguing the attachments made on the ink lines by the artist to speed up the workflow using machine learning.

In one implementation, the adhering mode of the enhanced ink line application enables the artist to draw directly onto the character(s) (and/or object(s)) on the drawing to provide the correct line for a specific pose on the character(s). Once the ink lines are drawn, the application enables the artist to use a nudging "brush" to quickly and easily adjust the drawing. In one implementation, the adhering mode is used on the most complex shots, where adjusting the machine learning in the adjusting mode is slower than obtaining the shot from scratch.

In one implementation, nudges created by the nudging brush are automatically keyed and interpolated by the application. In one implementation, keying and interpolation include directly projecting the ink lines onto the geometry and interpolating the nudges in a screen space or in an arbitrary UV space. The enhanced ink line application enables the artist to work in a 2-D screen space to provide the most intuitive space for the artist to draw and nudge to produce the desired result. The translation back to the 3-D space occurs automatically, without artist intervention.

In one implementation, the keying and interpolation uses nudging to create key frames and interpolate between the key frames. For example, the artist nudges the ink lines of the drawing in frame 1 and then performs nudging on the ink lines of the drawing in frame 10 to create two key frames 1 and 10. Then, the adhering mode of the enhanced ink line application interpolates between the key frames by automatically blending all frames between the two key frames.

In one implementation, the curve positions in the UV space controls where the character ends up in 3-D space. When the drawings are nudged these edits can be shifted to the UV space. Thus, there is a complex relationship between the position of the curves in the UV space relative to the view angle and expression of the character. With enough examples, the machine learning can find the pattern between the shape of the curves in the UV space and the view angle and expression of the character. Therefore, the machine learning maps this relationship.

In one implementation, the adjusting mode of the enhanced ink line application includes: (1) a first pass prediction of creating ink lines on the characters using machine learning to produce an initial predicted result; (2) modification by the artist using the "nudging brush"; and (3) once the initial predictions have been corrected by the artist using the nudge bush, the adjustments are shifted to the UV space. The data is then exported and combined with the initial data. The machine learning model is then "retrained" using the combined data. Thus, the "retraining" improves the accuracy of the model.

In one implementation, the training data for the first pass prediction uses "turntable" animation created from different angles with expression changes. The animated curves (i.e., the drawings) for these angles and expressions are then created using the adhering mode of the enhanced ink line application. The animated curves are subsequently shifted into a UV space for the machine learning training. This becomes the "target" of a first generation set of training data (around 600 frames per character). The "features" are relative camera angle and expression changes. Thus, once the training data is produced, the machine learning algorithm is trained to find the relationship between the drawing positions and the "features".

In one implementation, once the machine learning algorithm has been trained to find the relationship, the predictions are run on another set of animation data. These initial predictions are then adjusted (or 'corrected') by the artist using the nudge brush. These corrected adjustments are then moved to the UV space and exported as further training data. The machine learning model is then retrained using the combined training data of these corrections along with the initial training data.

FIG. 1 is a flow diagram of a process 100 for emulating artistic hand-drawn lines in CG animation in accordance with one implementation of the present disclosure. In one implementation, the process 100 provides an artist with easy controls to adjust the drawings to maintain the correct 2-D inspired design. For example, the process 100 enables the artist to use an electronic pen to draw on top of a frame of the CG animation. This allows the drawing of the frame to appear like a dynamic drawing instead of a standard texture map.

In the illustrated implementation of FIG. 1, the process 100 enables the artist, at block 110, to draw the ink lines directly onto the characters on the drawing to provide the correct line for a specific pose on the character. In one implementation, the characters are in frames of the CG animation. In one implementation, the ink lines drawn directly onto the characters provide correct ink lines for specific poses of the characters. The ink lines are then attached, at block 112, onto the animated character (i.e., onto the 3-D geometry). Once the ink lines are drawn and attached, the process 100 enables the artist to use a nudging "brush" to adjust the drawing, at block 114. The drawing is then moved to the UV space and the training data is generated, at block 116. The process 100 enables the artist to work in a 2-D screen space to provide the most intuitive space for the artist to draw and nudge to produce the desired result. The translation back to the 3-D space occurs automatically, without artist intervention.

In one implementation, the nudging creates key frames and interpolates between the key frames. For example, the artist nudges the ink lines of the drawing in frame 1 and then performs nudging on the ink lines of the drawing in frame 10 to create two key frames 1 and 10. The process 200 then interpolates between the key frames by automatically blending all frames between the two key frames.

In one implementation, once the drawing is moved to the UV space and the training data is generated, the process 100 creates the first generation machine learning model, at block 118, and the first generation machine learning model is called, at block 120, to make the prediction. Again, the ink lines are attached, at block 122, onto the animated character, and the artist is enabled to modify the prediction of ink lines, at block 124, using the "nudging brush". The drawing is then moved to the UV space and the training data is generated again, at block 126. At block 128, the first pass training data (generated at block 116) and the second pass training data (generated at block 126) are combined. Thus, once the training data are combined, the process 100 creates the second generation machine learning model, at block 130.

In one implementation, the training data for the first pass prediction uses "turntable" animation created from different angles with expression changes. The animated curves for these angles and expressions are then created by the process 100. The animated curves are subsequently converted into the UV space for the machine learning training. This becomes the "target" of a first generation set of training data (around 600 frames per character). The "features" are relative camera angle and expression changes. Thus, once the training data is produced, the machine learning algorithm is trained to find the relationship between the drawing positions and the "features".

Figure 2:
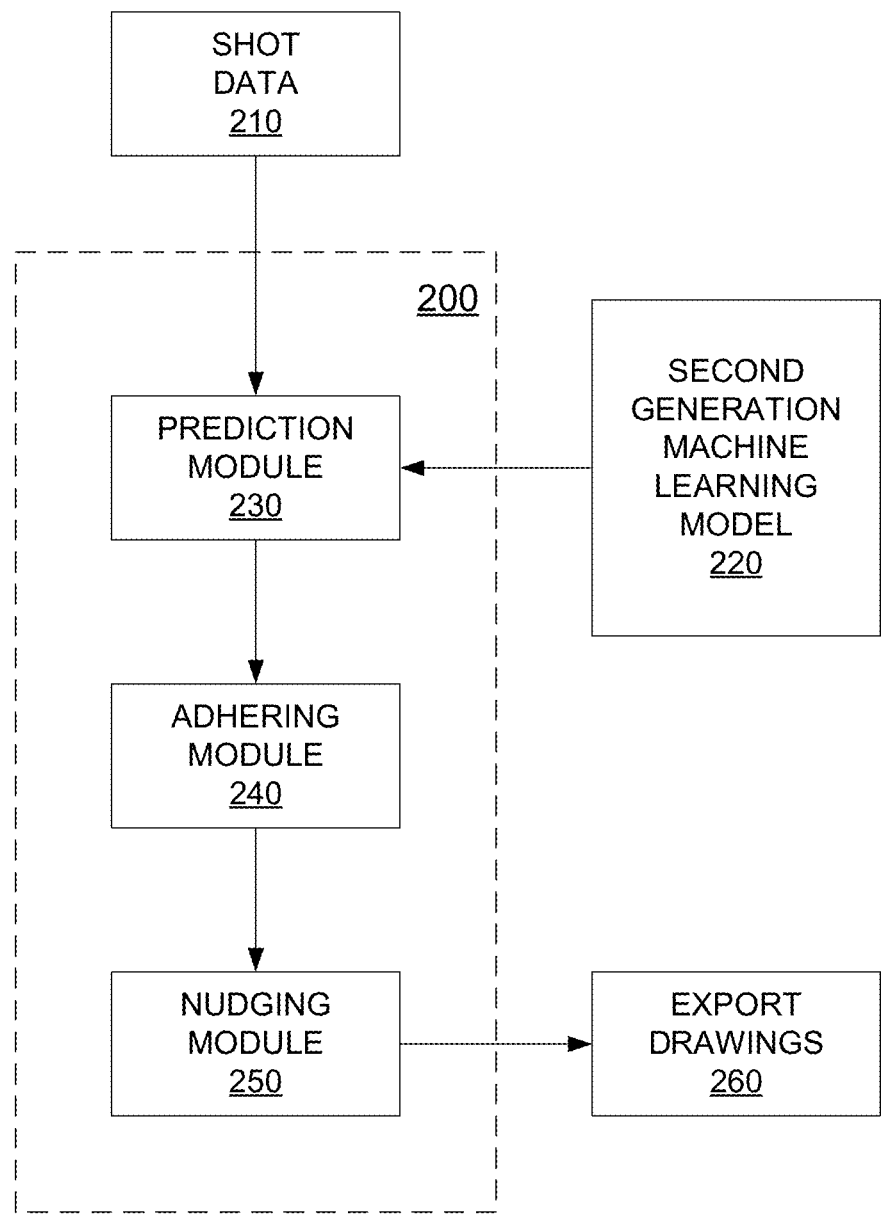
FIG. 2 is a block diagram of a system for emulating artistic hand-drawn lines in CG animation in accordance with one implementation of the present disclosure.

FIG. 2 is a block diagram of a system 200 for emulating artistic hand-drawn lines in CG animation in accordance with one implementation of the present disclosure. In the illustrated implementation of FIG. 2, the system 200 includes a prediction module 230, an adhering module 240, and a nudging module 250.

In one implementation, the prediction module 230 receives the shot data 210 and the second generation machine learning "model" 220 created, at block 130 in FIG. 1, and makes a prediction. The shot data 210 includes relative camera angle and relative expression.

In one implementation, the adhering module 240 is configured to receive the prediction from the prediction module 230 and to implement the adhering mode directed to adhering or attaching the ink lines (e.g., the curve geometry) onto the animated character. Thus, the adhering module 240 provides an artist with easy controls to adjust the drawings to maintain the correct 2-D inspired design. For example, in one implementation, the adhering module 240 enables the artist to use an electronic pen to draw on top of a frame of the CG animation.

In one implementation, once the ink lines are drawn and attached, the nudging module 250 enables the artist to use a nudging "brush" to adjust and move the drawing to the UV space. Thus, the nudging module 250 enables the artist to work in a 2-D screen space to provide the most intuitive space for the artist to draw and nudge to produce the desired result. The nudging module 250 performs the translation back to the 3-D space without the intervention of the artist. The drawing 260 output by the nudging module 250 is exported for lighting.

Figure 3:
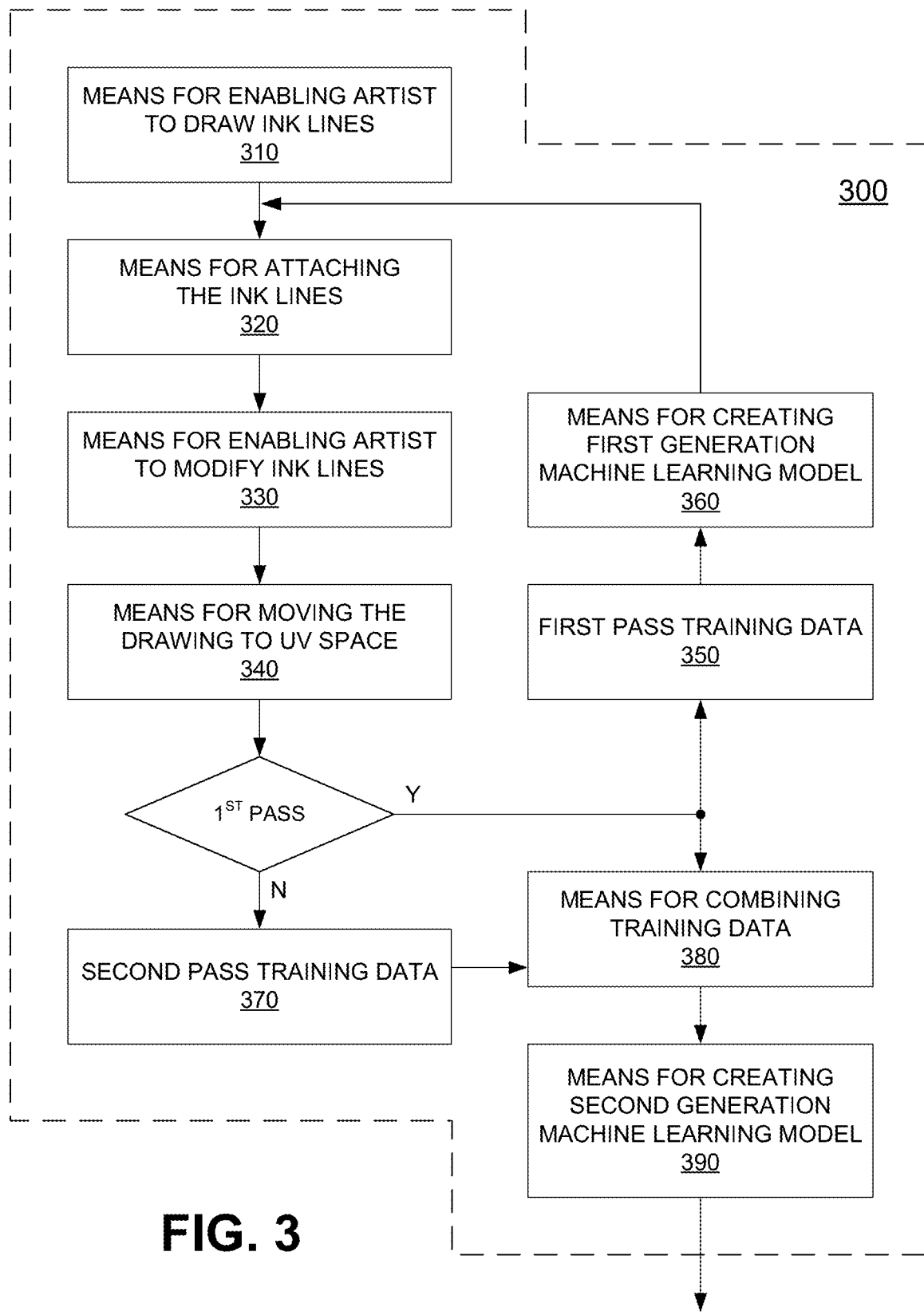
FIG. 3 is a block diagram of an apparatus for emulating artistic hand-drawn lines in CG animation in accordance with one implementation of the present disclosure.

FIG. 3 is a block diagram of an apparatus 300 for emulating artistic hand-drawn lines in CG animation in accordance with one implementation of the present disclosure. In the illustrated implementation of FIG. 3, the apparatus 300 includes means for enabling artist to draw ink lines 310, means for attaching the ink lines 320, means for enabling artist to modify the ink lines 330, means for moving the drawing to UV space 340, means for creating first generation machine learning model 360, means for combining training data 380, and means for creating second generation machine learning model 390.

The means for enabling artist to draw ink lines 310 enables the artist to draw the ink lines directly onto the character on the drawing to provide the correct line for a specific pose on the character. In one implementation, the means 310 includes a tablet or pad type of device and an electronic pen. In one implementation, the tablet device includes at least one application which is able to display the CG animation on a frame-by-frame basis.

The means for attaching the ink lines 320 attaches the ink lines drawn directly onto characters of the CG animation. In one implementation, the means 320 includes at least one application which is able to process the input made into the means 310 by the artist to integrate the input onto the CG animation.

The means for enabling artist to modify the ink lines 330 enables the artist to use a nudging "brush" to adjust the drawing. In one implementation, the means 330 includes a tablet or pad type of device and an electronic pen to be used as the nudging brush. In one implementation, the tablet device includes at least one application which is able to display the CG animation on a frame-by-frame basis. The means for enabling artist to modify the ink lines 330 also enables the artist to modify the prediction of the ink lines.

The means for moving the drawing to the UV space 340 moves the drawing to the UV space to enable the artist to work in a 2-D screen space to provide the most intuitive space for the artist to draw and nudge to produce the desired result. In one implementation, the means for moving the drawing to the UV space 340 uses nudging to create key frames and interpolate between the key frames. For example, the artist nudges the ink lines of the drawing in frame 1 and then performs nudging on the ink lines of the drawing in frame 10 to create two key frames 1 and 10. The means 340 then interpolates between the key frames by automatically blending all frames between the two key frames. The means for moving the drawing to the UV space 340 generates first pass training data 350 if the pass is the first pass, while the means for moving the drawing to the UV space 340 generates second training data 370 if the pass is not the first pass (i.e., the second pass).

The means for means for creating first generation machine learning model 360 creates the first generation machine learning model and sends the model to the means for attaching the ink lines 320 for the second pass.

In the second pass, the means for combining the training data 380 combines the first pass training data 350 and the second pass training data 370. The combined training data is used by the means for creating second generation machine learning model 390 to create the second generation machine learning model.

Figure 4A:
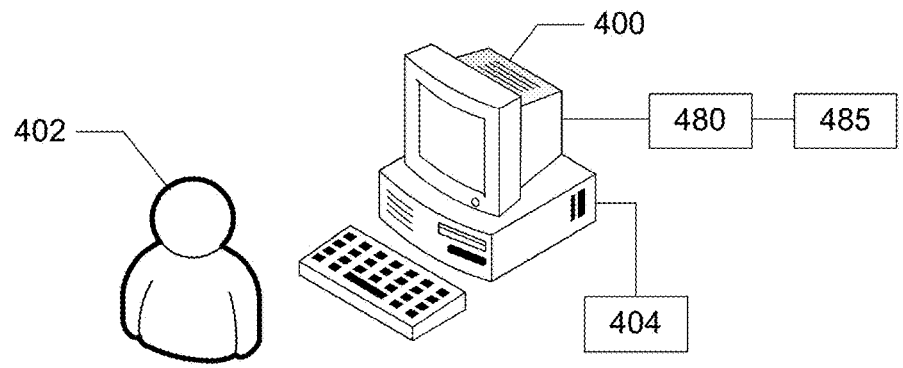
FIG. 4A is a representation of a computer system and a user in accordance with an implementation of the present disclosure.

FIG. 4A is a representation of a computer system 400 and a user 402 in accordance with an implementation of the present disclosure. The user 402 uses the computer system 400 to implement an emulation application 490 for emulating artistic hand-drawn lines in CG animation as illustrated and described with respect to the process 100 for emulating artistic hand-drawn lines in CG animation illustrated in FIG. 1 and the emulator 200 of the block diagram shown in FIG. 2.

Figure 4B:
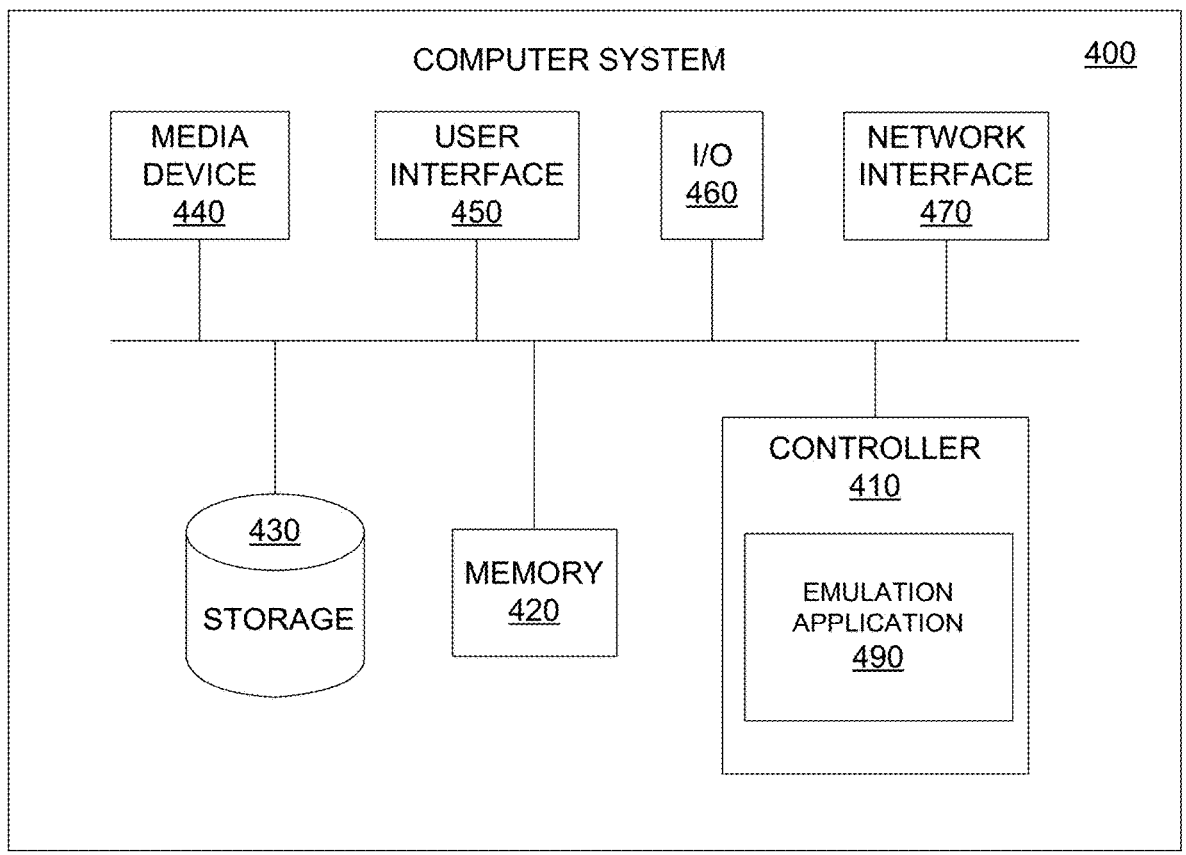
FIG. 4B is a functional block diagram illustrating the computer system hosting the emulation application in accordance with an implementation of the present disclosure.
Figure 5:
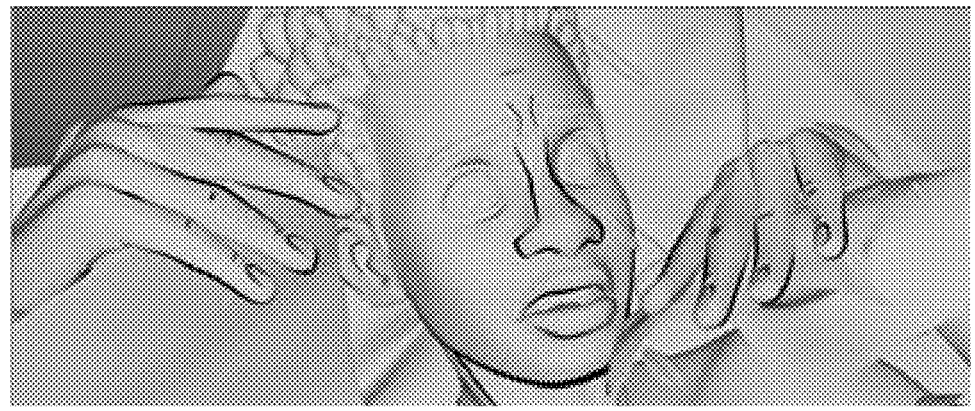
FIG. 5, FIG. 6, FIG. 7, and FIG. 8 illustrate examples of the intermediate results of emulation system, process, and apparatus.
Figure 6:
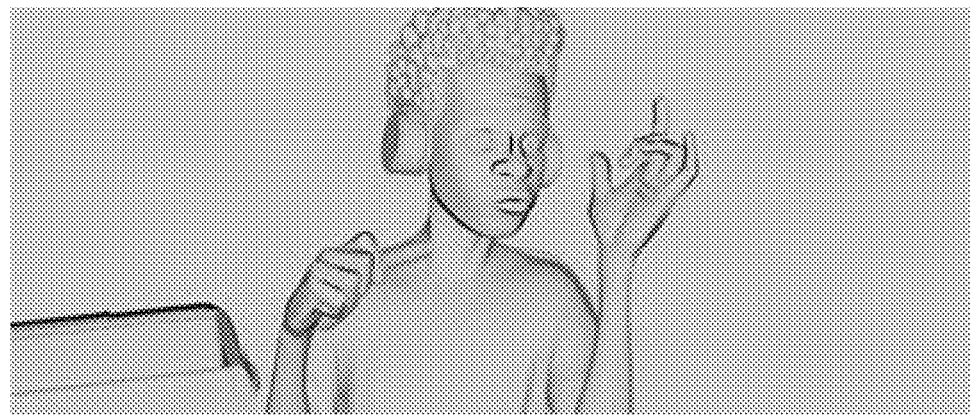
Figure 7:
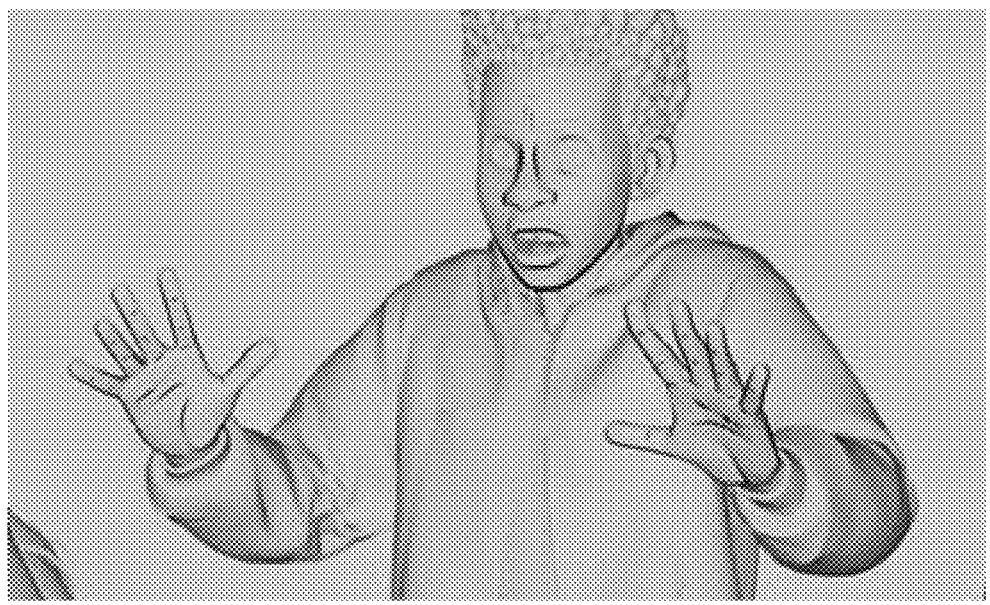
Figure 8:

The computer system 400 stores and executes the emulation application 490 of FIG. 4B. In addition, the computer system 400 may be in communication with a software program 404. Software program 404 may include the software code for the screen-tone look application. Software program 404 may be loaded on an external medium such as a CD, DVD, or a storage drive, as will be explained further below.

Furthermore, computer system 400 may be connected to a network 480. The network 480 can be connected in various different architectures, for example, client-server architecture, a Peer-to-Peer network architecture, or other type of architectures. For example, network 480 can be in communication with a server 485 that coordinates engines and data used within the emulation application 490. Also, the network can be different types of networks. For example, the network 480 can be the Internet, a Local Area Network or any variations of Local Area Network, a Wide Area Network, a Metropolitan Area Network, an Intranet or Extranet, or a wireless network.

FIG. 4B is a functional block diagram illustrating the computer system 400 hosting the emulation application 490 in accordance with an implementation of the present disclosure. A controller 410 is a programmable processor and controls the operation of the computer system 400 and its components. The controller 410 loads instructions (e.g., in the form of a computer program) from the memory 420 or an embedded controller memory (not shown) and executes these instructions to control the system. In its execution, the controller 410 provides the emulation application 490 with a software system, such as to enable the creation and configuration of engines and data extractors within the emulation application 490. Alternatively, this service can be implemented as separate hardware components in the controller 410 or the computer system 400.

Memory 420 stores data temporarily for use by the other components of the computer system 400. In one implementation, memory 420 is implemented as RAM. In one implementation, memory 420 also includes long-term or permanent memory, such as flash memory and/or ROM.

Storage 430 stores data either temporarily or for long periods of time for use by the other components of the computer system 400. For example, storage 430 stores data used by the emulation application 490. In one implementation, storage 430 is a hard disk drive.

The media device 440 receives removable media and reads and/or writes data to the inserted media. In one implementation, for example, the media device 440 is an optical disc drive.

The user interface 450 includes components for accepting user input from the user of the computer system 400 and presenting information to the user 402. In one implementation, the user interface 450 includes a keyboard, a mouse, audio speakers, and a display. The controller 410 uses input from the user 402 to adjust the operation of the computer system 400.

The I/O interface 460 includes one or more I/O ports to connect to corresponding I/O devices, such as external storage or supplemental devices (e.g., a printer or a PDA). In one implementation, the ports of the I/O interface 460 include ports such as: USB ports, PCMCIA ports, serial ports, and/or parallel ports. In another implementation, the I/O interface 460 includes a wireless interface for communication with external devices wirelessly.

The network interface 470 includes a wired and/or wireless network connection, such as an RJ-45 or "Wi-Fi" interface (including, but not limited to 802.11) supporting an Ethernet connection.

The computer system 400 includes additional hardware and software typical of computer systems (e.g., power, cooling, operating system), though these components are not specifically shown in FIG. 4B for simplicity. In other implementations, different configurations of the computer system can be used (e.g., different bus or storage configurations or a multi-processor configuration).

FIG. 5, FIG. 6, FIG. 7, and FIG. 8 illustrate examples of the intermediate results of emulation system, process, and apparatus.

In one implementation, the emulation system 200 is a system configured entirely with hardware including one or more digital signal processors (DSPs), general purpose microprocessors, application specific integrated circuits (ASICs), field programmable gate/logic arrays (FPGAs), or other equivalent integrated or discrete logic circuitry. In another implementation, the emulation system 200 is configured with a combination of hardware and software.

The description herein of the disclosed implementations is provided to enable any person skilled in the art to make or use the present disclosure. Numerous modifications to these implementations would be readily apparent to those skilled in the art, and the principals defined herein can be applied to other implementations without departing from the spirit or scope of the present disclosure. Thus, the present disclosure is not intended to be limited to the implementations shown herein but is to be accorded the widest scope consistent with the principal and novel features disclosed herein.

Various implementations of the present disclosure are realized in electronic hardware, computer software, or combinations of these technologies. Some implementations include one or more computer programs executed by one or more computing devices. In general, the computing device includes one or more processors, one or more data-storage components (e.g., volatile or non-volatile memory modules and persistent optical and magnetic storage devices, such as hard and floppy disk drives, CD-ROM drives, and magnetic tape drives), one or more input devices (e.g., game controllers, mice and keyboards), and one or more output devices (e.g., display devices).

The computer programs include executable code that is usually stored in a persistent storage medium and then copied into memory at run-time. At least one processor executes the code by retrieving program instructions from memory in a prescribed order. When executing the program code, the computer receives data from the input and/or storage devices, performs operations on the data, and then delivers the resulting data to the output and/or storage devices.

Those of skill in the art will appreciate that the various illustrative modules and method steps described herein can be implemented as electronic hardware, software, firmware or combinations of the foregoing. To clearly illustrate this interchangeability of hardware and software, various illustrative modules and method steps have been described herein generally in terms of their functionality. Whether such functionality is implemented as hardware or software depends upon the particular application and design constraints imposed on the overall system. Skilled persons can implement the described functionality in varying ways for each particular application, but such implementation decisions should not be interpreted as causing a departure from the scope of the present disclosure. In addition, the grouping of functions within a module or step is for ease of description. Specific functions can be moved from one module or step to another without departing from the present disclosure.

All features of each above-discussed example are not necessarily required in a particular implementation of the present disclosure. Further, it is to be understood that the description and drawings presented herein are representative of the subject matter which is broadly contemplated by the present disclosure. It is further understood that the scope of the present disclosure fully encompasses other implementations that may become obvious to those skilled in the art and that the scope of the present disclosure is accordingly limited by nothing other than the appended claims.

The invention claimed is:

1. A method for emulating artistic hand-drawn lines in CG animation and generating a drawing, the method comprising:
   receiving shot data including camera angle and expression and a machine learning model to generate a prediction of the drawing;
   first attaching ink lines drawn by an artist directly onto characters of the CG animation of the prediction formed in a 3-D geometry to provide correct ink lines for specific poses of the characters;
   first enabling the artist to modify the ink lines using nudges to generate a drawing and to adjust the drawing,
   wherein the ink lines are modified by the artist using an electronic pen to draw on top of a frame of the CG animation,
   wherein the nudges (1) generate key frames and (2) interpolate between the key frames by automatically blending all frames between the key frames;
   first moving the drawing into a UV space and enabling the artist to work on the 3-D geometry of the characters in a 2-D screen space,
   wherein curve positions in the UV space control where the characters end up in the 3-D geometry by corresponding the curve positions in the UV space to the camera angle and expression;
   translating the characters in the 2-D screen space back into the 3-D geometry and generating first pass training data;
   second attaching the ink lines onto the characters of the CG animation;
   second enabling the artist to modify the ink lines to adjust the drawing;
   second moving the drawing into the UV space and enabling the artist to work on the 3-D geometry of the characters in a 2-D screen space;
   translating the characters in the 2-D screen space back into the 3-D geometry and generating second pass training data;
   combining the first pass training data and the second pass training data to generate combined data; and
   creating and outputting machine learning using the combined data.

2. The method of claim 1, wherein the characters are in frames of the CG animation.

3. The method of claim 1, further comprising generating key frames and interpolating between the key frames.

4. The method of claim 1, wherein the nudges are created using a nudging brush.

5. He method of claim 1, further comprising
   keying and interpolating the nudges by directly projecting the ink lines onto the characters.

6. A system for emulating, in CG animation, lines hand drawn by an artist and generating a drawing, the system comprising:
   a predictor to receive shot data including camera angle and expression and a machine learning model to generate a prediction of the drawing;
   adherer to receive the prediction and attach ink lines onto a 3-D geometry of an animated character of the prediction formed in a 3-D geometry to provide correct ink fines for specific poses of the animated character; and
   a nudger to enable the artist to modify the ink lines using a nudging brush to generate nudges and move and adjust, the drawing to a UV space,
   first attaching ink lines drawn by the artist directly onto characters of the CG animation to provide correct ink lines for specific poses of the characters;
   first enabling the artist to modify the ink lines using nudges to generate a drawing and to adjust the drawing,
   wherein the ink lines are modified by the artist using an electronic pen to draw on top of a frame of the CG animation,
   wherein the nudges (1) generate key frames and (2) interpolate between the key frames by automatically blending all frames between the key frames;
   first moving the drawing into a UV space and enabling the artist to work on the 3-D geometry of the characters in a 2-D screen space,
   wherein curve positions in the UV space control where the characters end up in the 3-D geometry by corresponding the curve positions in the UV space to the camera angle and expression;
   translating the characters in the 2-D screen space back into the 3-D geometry and generating first pass training data;
   second attaching the ink lines onto the characters of the CG animation;
   second enabling the artist to modify the ink lines to adjust the drawing;
   second moving the drawing into the UV space and enabling the artist to work on the 3-D geometry of the characters in a 2-D screen space;
   translating the characters in the 2-D screen space back into the 3-D geometry and generating second pass training data;
   combining the first pass training data and the second pass training data to generate combined data; and
   creating and outputting machine learning using the combined data.

7. The system of claim 6, wherein training data for the predictor uses animated curves created for a set of angles with a set of corresponding expression changes.

8. An apparatus for emulating artistic hand-drawn lines in CG animation to generate a drawing, the apparatus comprising:
- means for receiving shot data including camera angle and expression and a machine learning model to generate a prediction of the drawing;
- means for first enabling to enable an artist to draw ink lines directly onto an animated character in the drawing;
- means for attaching to attach the drawn ink lines by the artist directly onto the animated character of the prediction formed in a 3-D geometry to provide correct ink lines for specific poses of the animated character;
- means for second enabling to enable the artist to modify the ink lines using nudges to generate a drawing and to adjust the drawing,
- wherein the ink lines are modified by the artist using an electronic pen to draw on top of a frame of the CG animation,
- wherein the nudges (1) generate key frames and (2) interpolate between the key frames by automatically blending all frames between the key frames;
- means for moving to move the drawing to a UV space to enable the artist to work in a 2-D screen space, wherein the means for moving generates first pass training data if a pass is a first pass, while the means for moving generates second training data if the pass is not the first pass,
- wherein curve positions in the UV space control where the characters end up in the 3-D geometry by corresponding the curve positions in the UV space to the camera angle and expression;
- means for translating the animated characters in the 2-D screen space back into the 3-D geometry;
- first means for creating to create a first-generation machine learning model and send it to the means for attaching for a second pass;
- means for combining to combine the first pass training data and the second pass training data to generate combined data; and
- second means for creating to create a second-generation machine learning model using the combined data.

9. The apparatus of claim 8, wherein the means for first enabling includes a tablet or pad type of device and an electronic pen.

10. The apparatus of claim 9, wherein the tablet or pad type of device includes at least one application which is able to display the CO animation on a frame-by-frame basis.

11. The apparatus of claim 8, wherein the means for attaching includes at least one application which is able to process an input made into the means for attaching by the artist to integrate the input onto the CO animation.

12. The apparatus of claim 8, wherein the means for second enabling enables the artist to use a nudging brush to make the nudges.

13. The apparatus of claim 8, wherein the means for moving uses the nudges to create key frames and interpolate between the key frames.

14. The apparatus of claim 13, wherein the means for moving interpolates between the key frames by automatically blending all frames between the key frames.

* * * * *